(12) United States Patent
    Sorg

(10) Patent No.: US 9,726,322 B1
(45) Date of Patent: Aug. 8, 2017

(54) GREASE GUN AND CARTRIDGE UNIT

(71) Applicant: GREE-SEE Technology, LLC, Johnson City, TN (US)

(72) Inventor: Daniel Mark Sorg, Elizabethton, TN (US)

(73) Assignee: GREE-SEE TECHNOLOGY, LLC, Johnson City, TN (US)

( * ) Notice: Subject to any disclaimer, the term of this patent is extended or adjusted under 35 U.S.C. 154(b) by 0 days.

(21) Appl. No.: 14/756,847

(22) Filed: Oct. 21, 2015

Related U.S. Application Data

(60) Provisional application No. 62/122,443, filed on Oct. 21, 2014.

(51) Int. Cl.
| *F16N 3/12* | (2006.01) |
| *F16N 19/00* | (2006.01) |
| *F16N 21/00* | (2006.01) |
| *B65D 83/00* | (2006.01) |
| *F16N 11/10* | (2006.01) |

(52) U.S. Cl.
CPC ............. *F16N 3/12* (2013.01); *B65D 83/005* (2013.01); *F16N 21/00* (2013.01); *F16N 11/10* (2013.01); *F16N 19/00* (2013.01)

(58) Field of Classification Search
CPC . F16N 3/12; F16N 21/00; F16N 19/00; F16N 11/10; B65D 83/005
See application file for complete search history.

(56) References Cited

U.S. PATENT DOCUMENTS

| 3,393,840 | A | * | 7/1968 | Sundholm | F16N 3/12 222/256 |
| 4,601,412 | A | * | 7/1986 | Martin | F16N 3/12 222/256 |
| 5,139,178 | A | * | 8/1992 | Arch | B05C 17/00516 222/326 |
| 6,068,164 | A | * | 5/2000 | Totaro | F16N 3/12 222/389 |
| 6,834,781 | B1 | * | 12/2004 | Mueller | F16N 5/02 222/262 |
| 8,297,476 | B2 | * | 10/2012 | Weems | F16N 3/12 184/105.2 |
| 9,057,482 | B2 | * | 6/2015 | Hung | F16N 5/02 |
| 2015/0233524 | A1 | * | 8/2015 | Kuo | F16N 3/12 222/386 |

* cited by examiner

*Primary Examiner* — Frederick C Nicolas
(74) *Attorney, Agent, or Firm* — Matthew M. Googe; Robinson IP Law, PLLC

(57) ABSTRACT

A grease gun, in one preferred embodiment, wherein the grease containing portion of the cartridge consists principally of transparent plastic material, wherein the cartridge stands alone without a surrounding supporting metal barrel, wherein the cartridge has an air vented bottom end and an open top end which is non-removably fixed to the grease inlet portion of a pumping head, wherein the pumping head body including the pumping handles is composed of a single plastic molding, wherein the cartridge has no pressurizing spring and piston and no grease compression rod, wherein ambient air pressure is utilized to load the head, wherein valving structures in the head are molded of plastic material, wherein the valving structures are positioned in the head to allow self priming of the pumping structure, and whereby the gun components are easy to assemble, are light weight, and are easy to use.

14 Claims, 11 Drawing Sheets

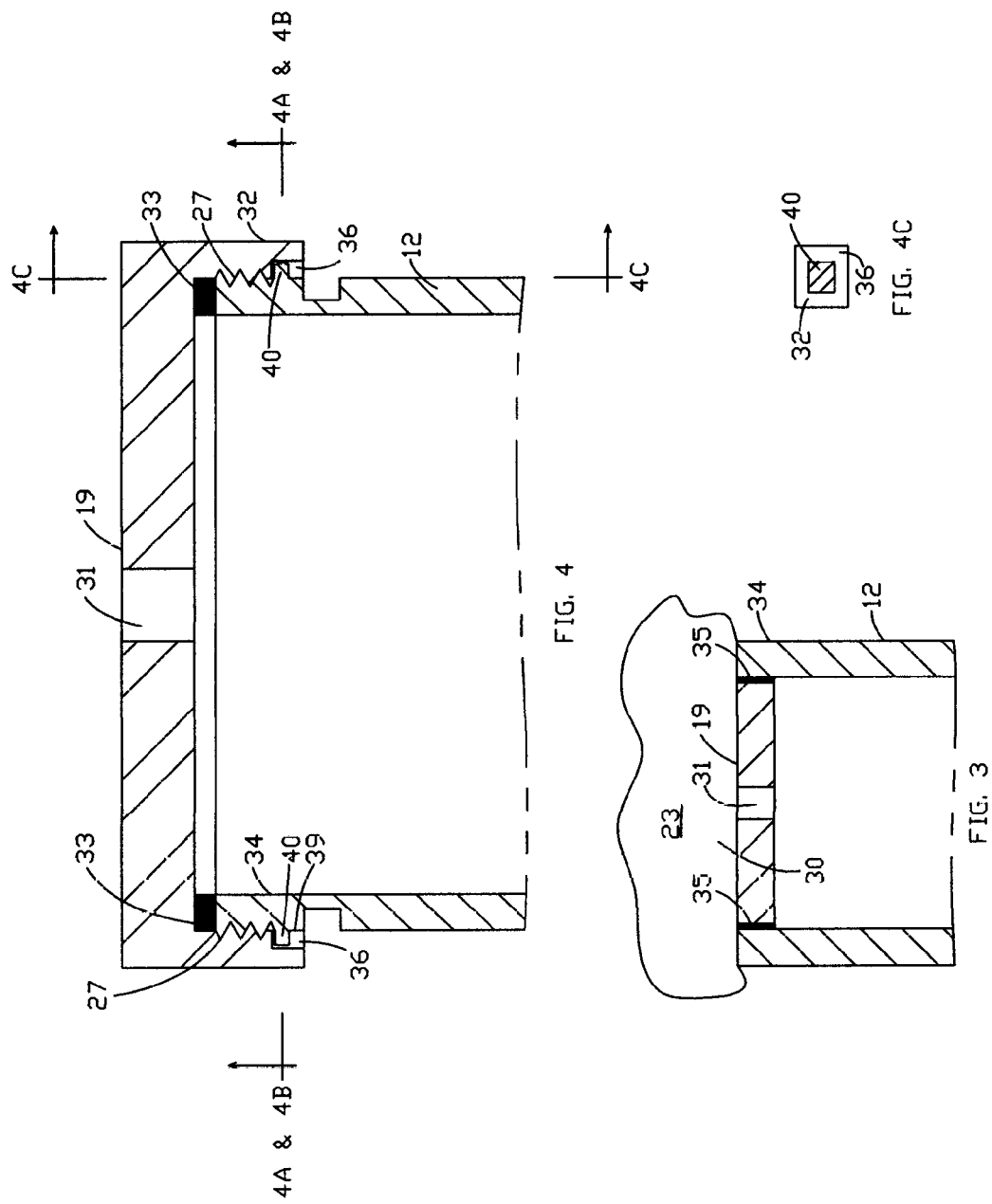

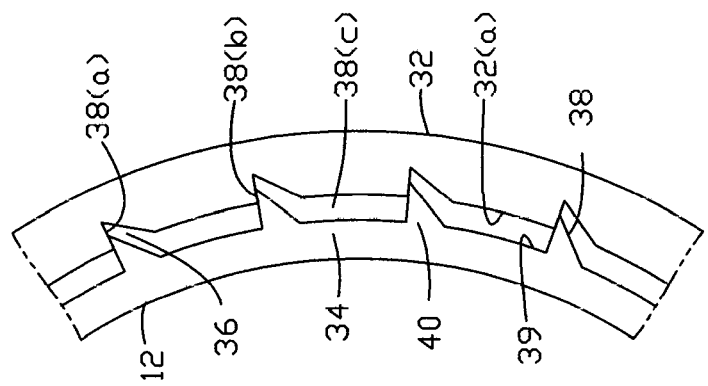
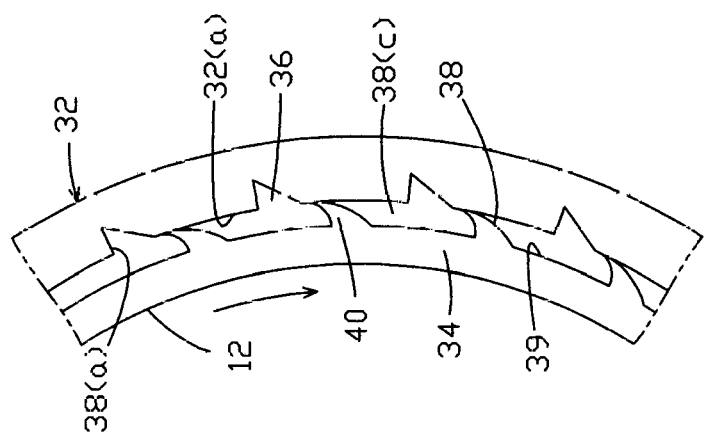

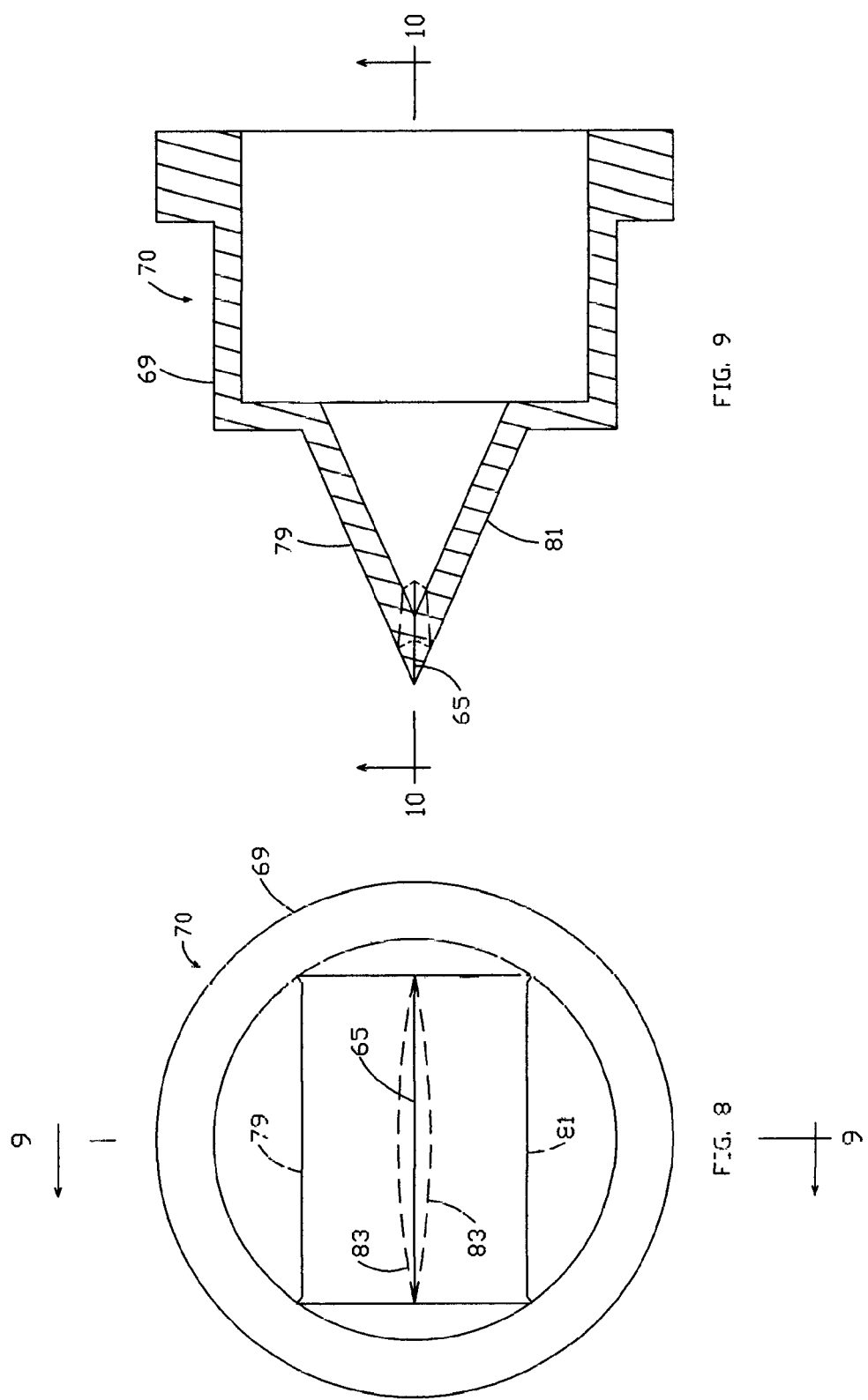

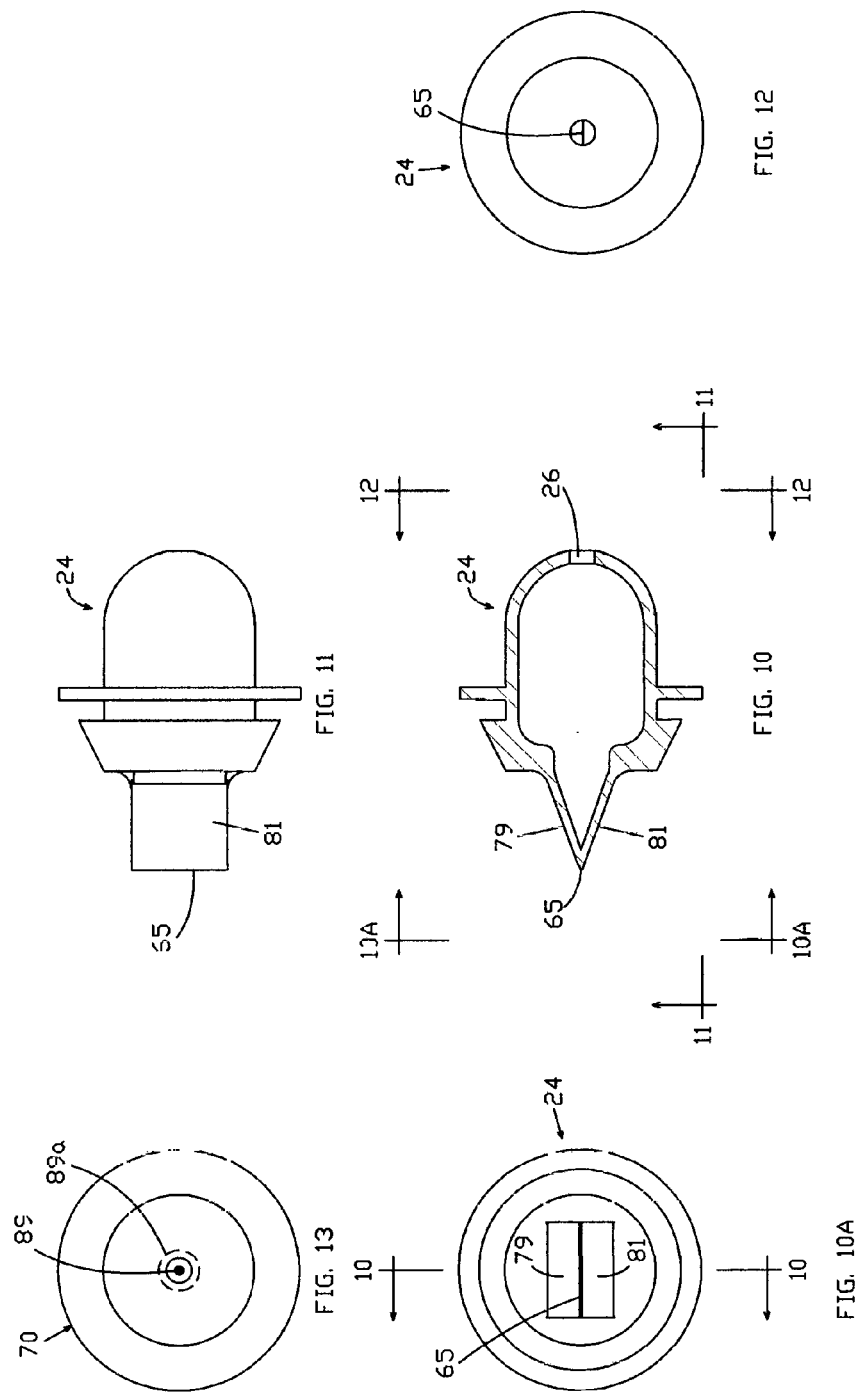

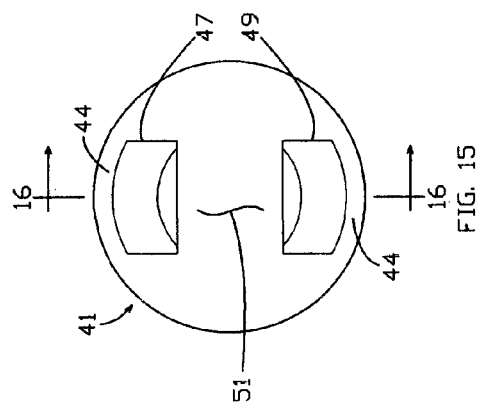
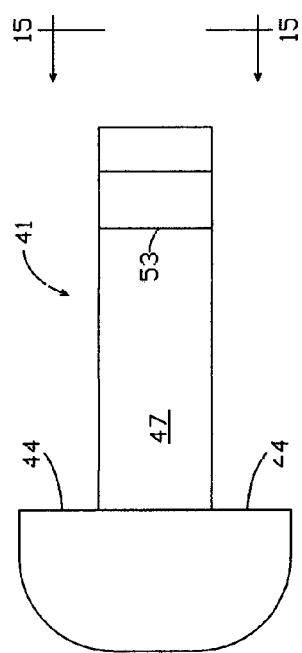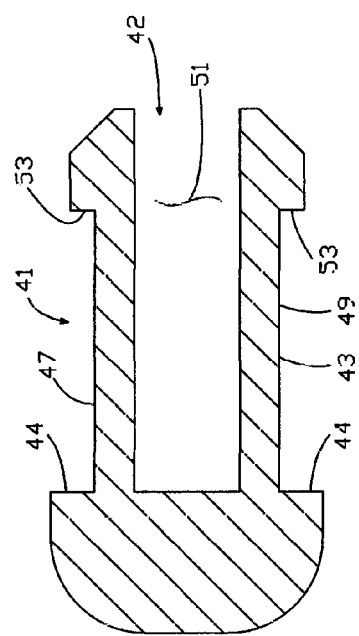

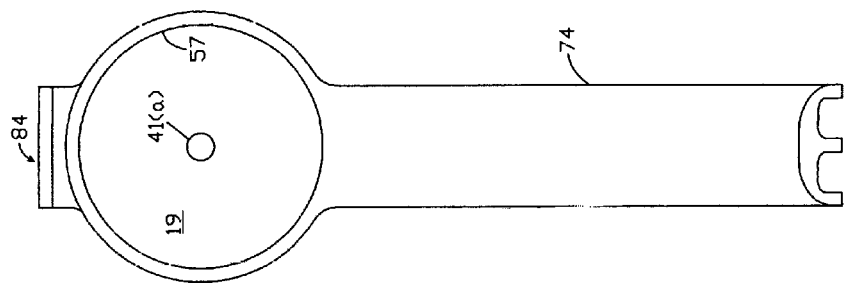
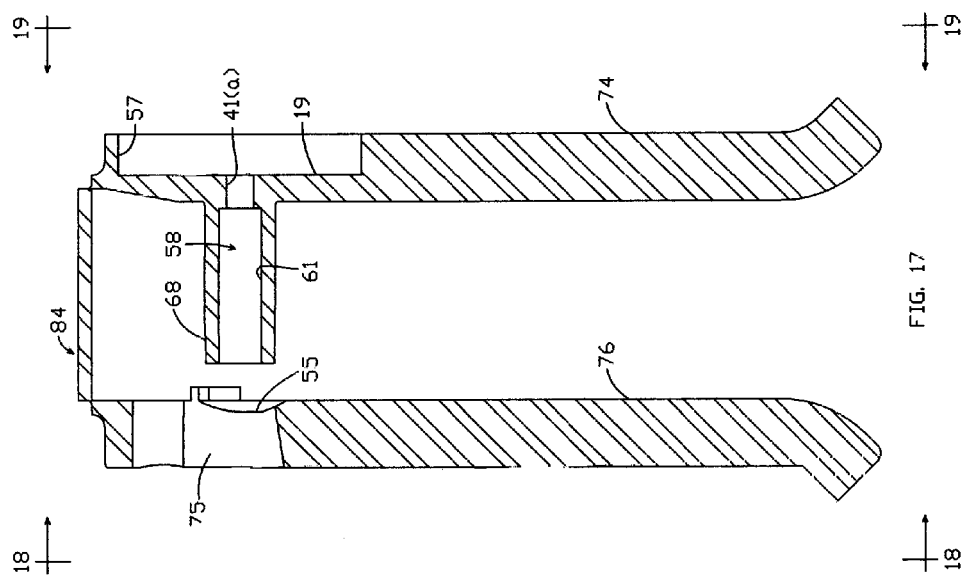
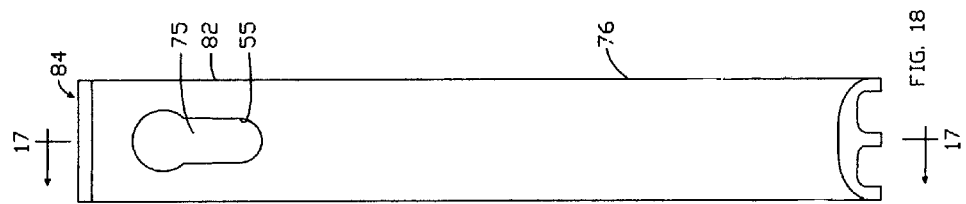

GREASE GUN AND CARTRIDGE UNIT

This application claims priority under 35 U.S.C. 119(e)(1) based on Applicant's Provisional U.S. Patent Application Ser. No. 62/122,443 filed Oct. 21, 2014, of same title.

BACKGROUND

Field

This application is directed to a unique grease gun construction having multiple advantages over such guns which are available in the market place in regard to the ease of manufacture, utility, cost, and operation, and wherein the gun components can be manufactured practically entirely of molded plastic such as polyolefin, butyrate, polyurethane, polyesters, polyamides, or the like, wherein the grease cartridge requires no grease pressurizing spring or outer supporting barrel which is typically of metal, and wherein the present cartridge, preferably, is transparent for allowing the operator to clearly view the grease material within the cartridge whereby the type, composition, brand or the like and the amount of grease dispensed to, e.g., the ZERK fitting, and to view the amount of grease remaining in the cartridge, or to view a contaminant, e.g., water or solids in the grease or any separation of grease components, e.g., into layers.

Prior Art

Heretofore, grease guns have been constructed mainly of expensive, relatively heavy metal parts such as the grease cartridge containing heavy metal barrels and cartridge containing a steel grease pressurizing spring and a spring compression rod (cocking plunger), and a metal grease pumping and ejection head, wherein the cartridge loading operation for such structures, particularly where the pressurizing spring cocking plunger must be retracted and held in place while the cartridge is positioned in the barrel, can be a difficult operation for many operators. Also, such structures do not allow the operator to view the contents of the cartridge or the legends on the cartridge wall surface which denote, e.g., the type of grease, the source information, the amount of grease in the cartridge, and the condition of the grease, e.g., whether separation of the grease has occurred, in the cartridge. Further the present invention, in a preferred embodiment is constructed to so as prevent removal of an empty cartridge and its replacement with a cartridge having the wrong and deleterious type of grease for some highly sensitive application Typical of such prior art grease gun structures are shown in U.S. Pat. Nos. 1,697,217; 1,714,214; 4,601,412; 3,187,959; 1,633,356; 1,812,643; 3,393,840; 3,341,084; 2,284,533, the disclosures of which are hereby incorporated herein by reference in their entireties.

SUMMARY OF THE INVENTION

A grease gun, in one preferred embodiment, wherein the grease containing portion of the cartridge consists principally of transparent plastic material, wherein the cartridge stands alone without a surrounding supporting metal barrel, wherein the cartridge has an air vented bottom end and an open top end which is non-removably fixed to the grease inlet portion of a pumping head, wherein the pumping head body including the pumping handles is composed of a single plastic molding, wherein the cartridge has no pressurizing spring, no piston and no grease compression rod, wherein ambient air pressure is utilized to load the head with grease, wherein valving structures in the head are of molded plastic material, wherein said valving structures are positioned in the head to allow self priming of the pumping structure, and whereby the gun components are easy to assemble, are light weight, and are easy to use.

The reason for such construction wherein the cartridge is non-removably fixed to the pumping or ejection head is to prevent the inadvertent cartridge replacement with a cartridge containing grease which is not of the correct composition and which is, in fact, detrimental to the structure which is to be lubricated. Such sensitive structures are commonly found in the aeronautics and space industry, the medical field, the electronics industry, and many other industrial areas. Also, with prior grease guns, this problem can still remain even though the cartridge mistake is discovered before the lubrication process is started anew with the correct grease, since the incorrect grease may already have been pumped into the interstices of the head and the outlet conduit.

BRIEF DESCRIPTION OF THE DRAWINGS

The invention will be further understood from the drawings herein wherein the structures of various figures are not drawn to scale or consistent proportions and wherein:

FIG. 1 A is an enlarged view of the dotted line area "A" of FIG. 1;

FIGS. 3, 4, 4A, and 4B, are enlarged cross-sectional views of the upper portion of the cartridge and adjacent portions of the gun or pump head cap showing alternative connection means of the present cartridge to the pump head;

FIG. 4C is a view taken along line 4C-4C in FIG. 4 and showing the ratchet type indentation and tooth construction of FIGS. 4A and 4B;

FIG. 8 is an enlarged view of the head structure taken along line 8-8 in FIG. 6 wherein the grease ejection mode of its valving shown by dotted line;

FIG. 9 is a cross-sectional view of the preferred "duck bill" type of valve taken along line 9-9 in FIG. 8;

FIG. 10 is a cross-sectional view showing the "duck bill" type valve in combination with the cartridge air vent primer bulb;

FIG. 10A is an end view taken along line 10A-10A in FIG. 10;

FIG. 11 is a side view of the structure of FIG. 10 taken along line 11-11 in FIG. 10;

FIG. 12 is an end view of the cartridge air vent valve (duck bill configuration) taken along line 12-12 in FIG. 10;

FIG. 13 is an outlet end view showing a useful variation of the "duck bill" orifice as being a circular, pin point aperture;

FIG. 14 is a side view of the preferred inlet valve to the load chamber;

FIG. 15 is an end view taken along line 15-15 in FIG. 14;

FIG. 16 is a cross-sectional view taken along line 16-16 in FIG. 15;

FIG. 17 is a cross-sectional view of the gun body taken along line 17-17 in FIG. 18;

FIG. 18 is a view taken along line 18-18 in FIG. 17; and

FIG. 19 is a view taken along line 19-19 of FIG. 17.

DETAILED DESCRIPTION OF THE DRAWINGS

Figures 1, 1A:
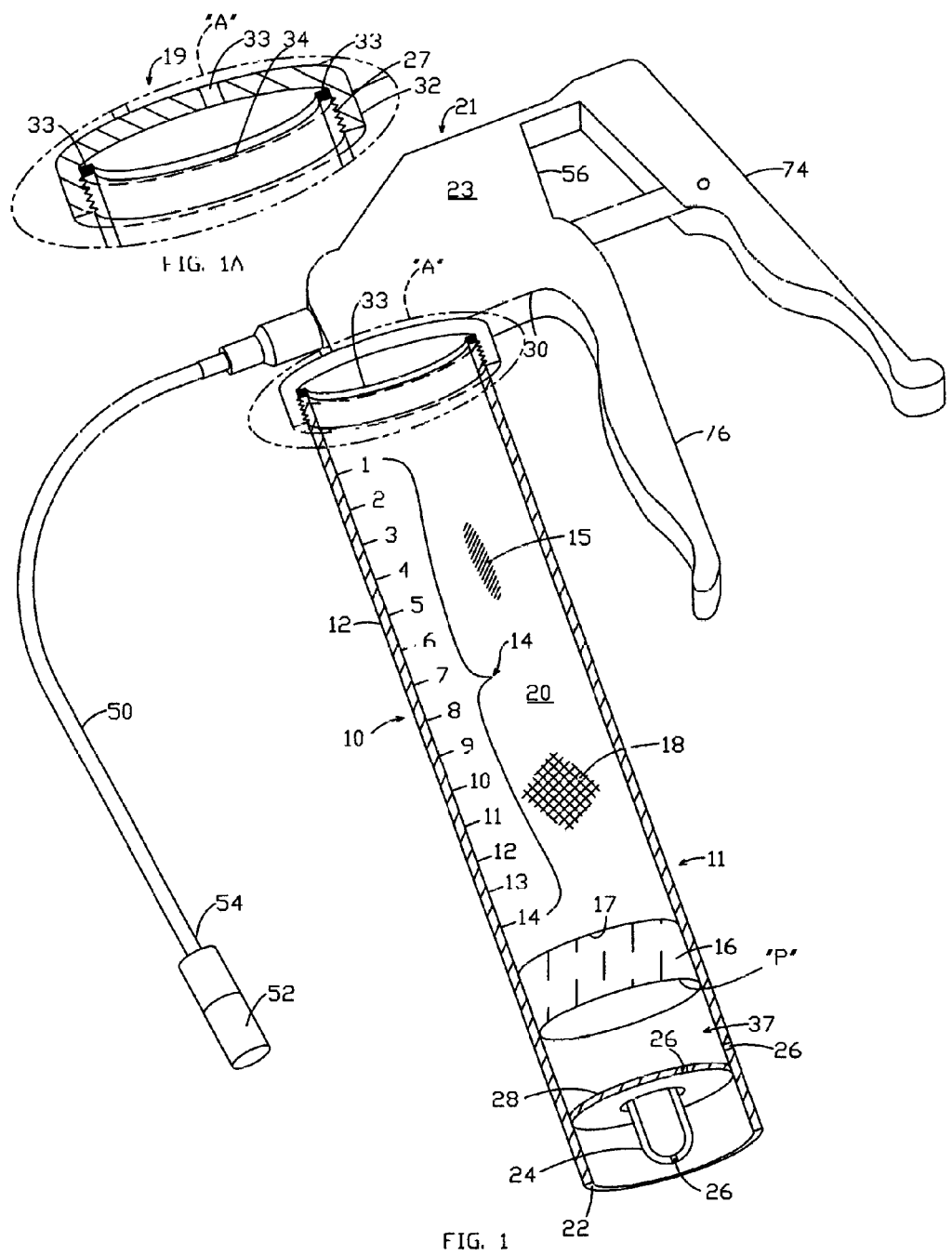
FIG. 1 is a perspective view of an embodiment of the present grease gun wherein the entire grease ejection head and grease cartridge can be of readily disposable material.
Figure 2:
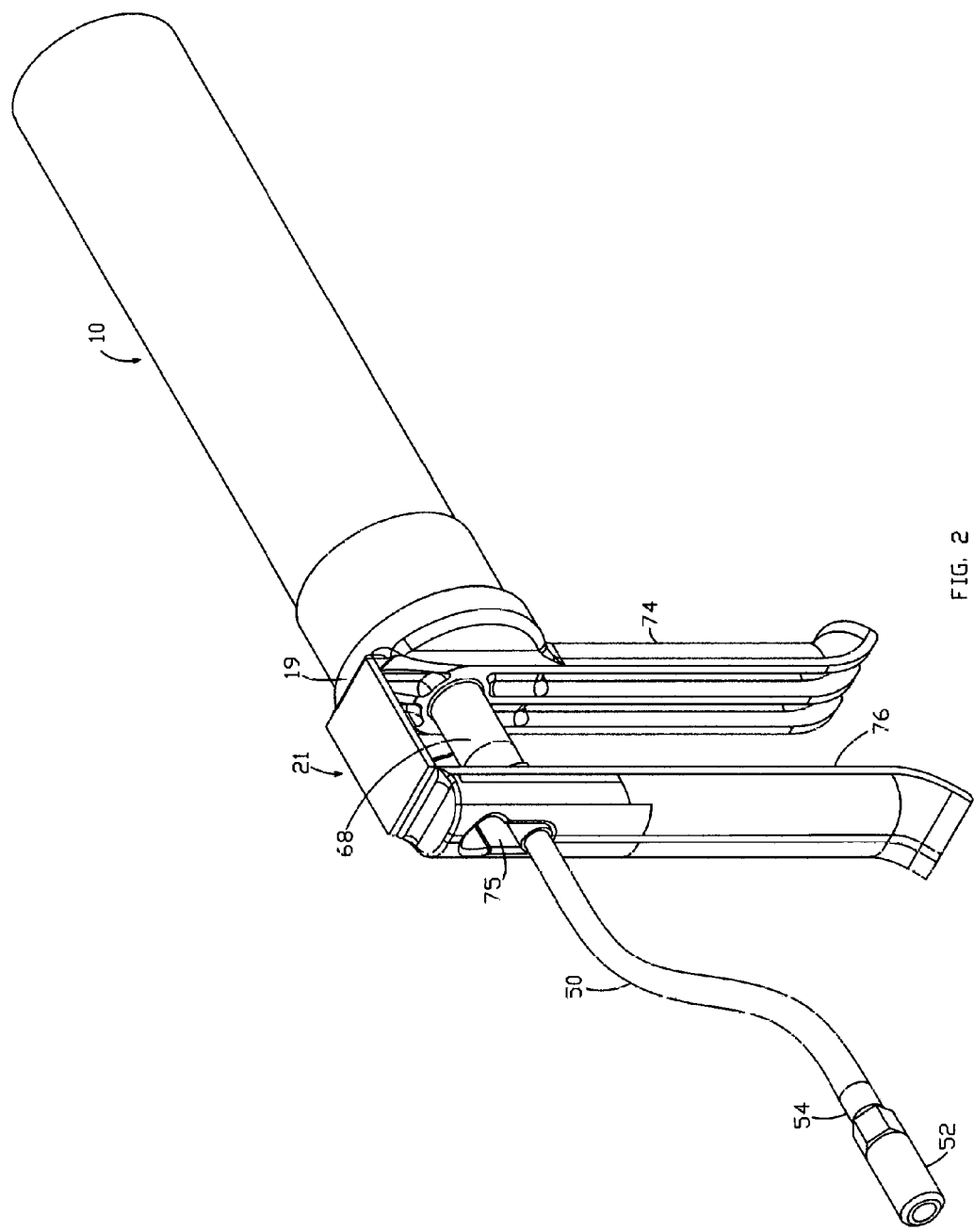
FIG. 2 is an isometric exterior view of a preferred structural configuration of the gun.
Figure 5:
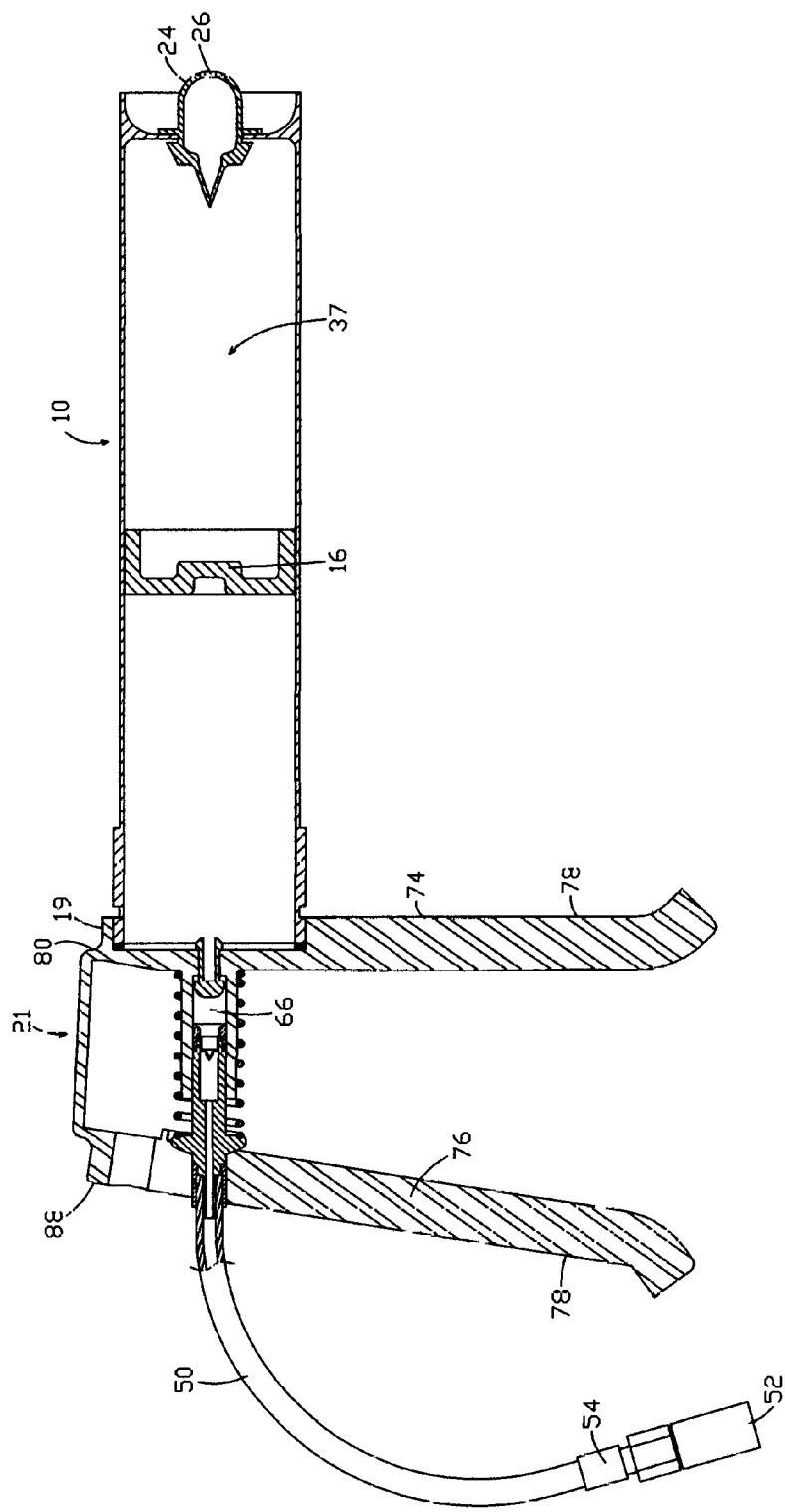
FIG. 5 is a cross-sectional view showing the grease pumping system in its grease suction mode.

Referring to the drawings and claims herein the grease cartridge as shown in FIG. 1 is comprised of a transparent cylindrical body 10 of fairly rigid molded plastic, preferably having graduated fill markings 14 and other grease identification insignia 15 thereon. A wiper disc 16 may be used and is slidable longitudinally in the body 10 and prevents grease 18 within reservoir chamber 20 from leaking, e.g., by gravity from the bottom end 22 of the cartridge. It is particularly noted that applicant has discovered that the suction forces generated by the grease pumping action in the gun head 21 are sufficient for ambient atmospheric pressure "P" bleeding, e.g., thru bleed hole 26 into ambient air chamber 37, to force and maintain disc 16 up against the bottom portion 17 of the grease in chamber 20 as the grease pumping action is in progress.

As shown in the drawings and in the event that, e.g., one or more pumping strokes may be helpful to more rapidly prime the grease pumping system in head 21, a slight pressure "P" applied against the bottom of disc 16, e.g., by any means including finger pressure where the cartridge bottom end is uncapped, or by a flexible primer bulb 24 or equivalent such as a lawn mower fuel primer, can be used. Small air bleed hole 26 which can be one-way valved can be provided in bottom cap 28 or cartridge wall 12 should such a cap be desired in order to catch any unlikely grease leakage past disc 16.

As shown in FIGS. 3, 4, 4A, 4B and 4C, the bottom portion 30 of the gun or pump head 21 may be constructed with a molded cap section 19 having annular rim 32 over or in which the top end 34 of the grease filled cartridge can be fitted and, if desired, sealed by elastomeric annular seal 35, and secured to 19, e.g., by being screwed into or over rim by threads 27, or permanently adhesively affixed thereto as at 35 in FIG. 3. Grease inlet port 31 to the grease pump is formed through 19. To emphasize, the uniqueness of the present structures, unobvious aspects of the present invention reside in (a) no heavy metal barrel for containing the cartridge 10, (b) the transparent wall of the present cartridge, (c) no longitudinally extending grease pressurizing spring, (d) no spring urged piston, (e) no cocking rod, (f) no air bleed hole in the gun head cap, and (g) none of their operations are needed for the present cartridge, and in a highly preferred embodiment, the head body 23 including handles, are plastic molded as a one piece molding.

Referring further to the drawings, FIGS. 4A and 4B which are greatly enlarged for clarity show a ratchet locking type of cartridge attachment to head 21 wherein the inner surface 32(a) of rim 32 of cap 19 is provided with one or more locking indentations 36 providing reverse rotation stop shoulders 38(a), and wherein the cartridge top end 34 is provided on its outer surface 39 with one or more resilient teeth 40, whereby clockwise rotation of the cartridge will ride leading edges 38 of teeth 40 over indentations 36 causing temporary resilient deflection of teeth 40 into indentations 36, but will not allow reverse rotation of the cartridge. Space 38(c) allows teeth 40 room to flex out of the way of indentations 36 on assembly rotation of the cartridge.

Figure 6:
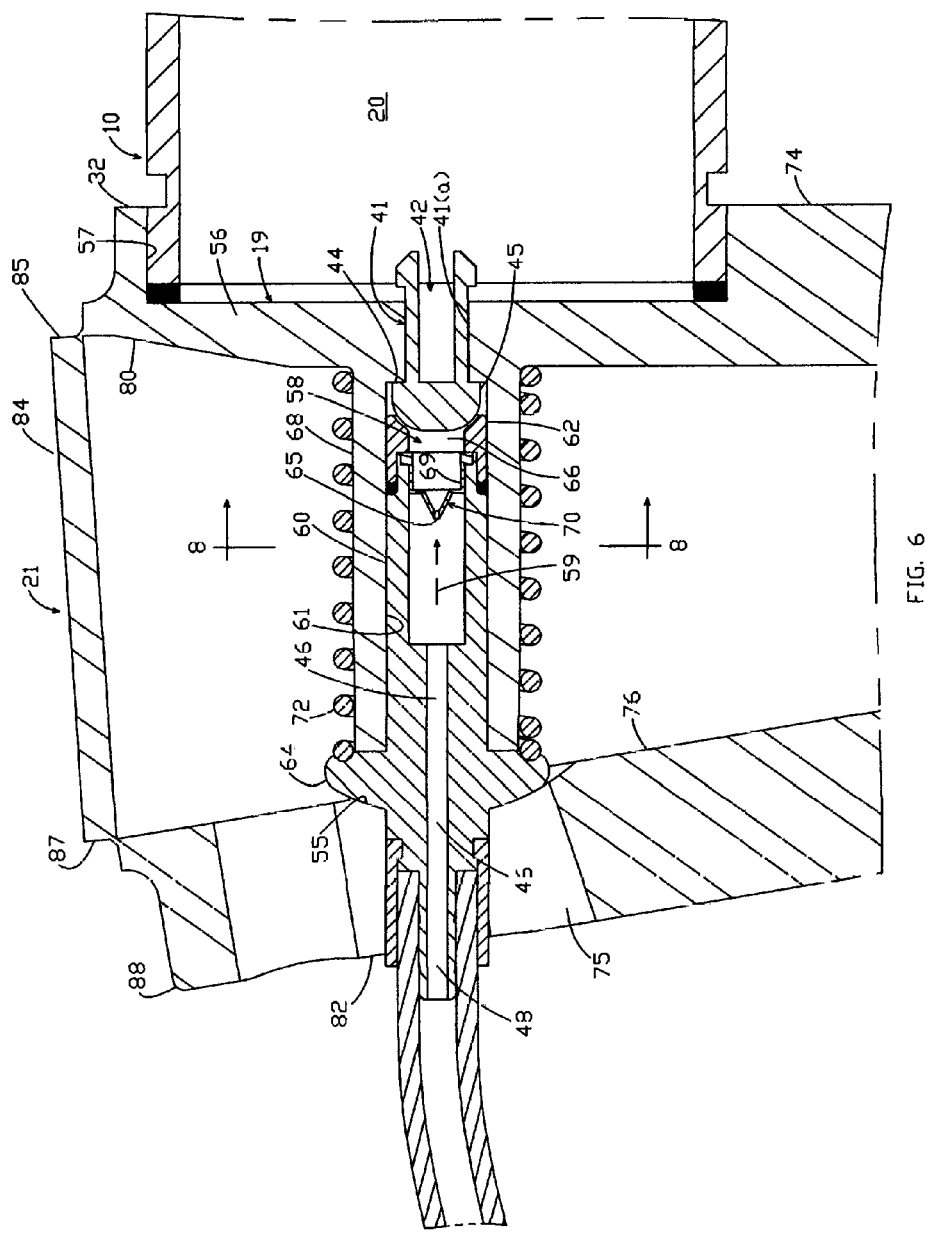
FIG. 6 is cross-sectional view of a preferred embodiment of the present gun wherein the grease pumping valve system is shown near the end of its grease ejection mode.
Figure 7:
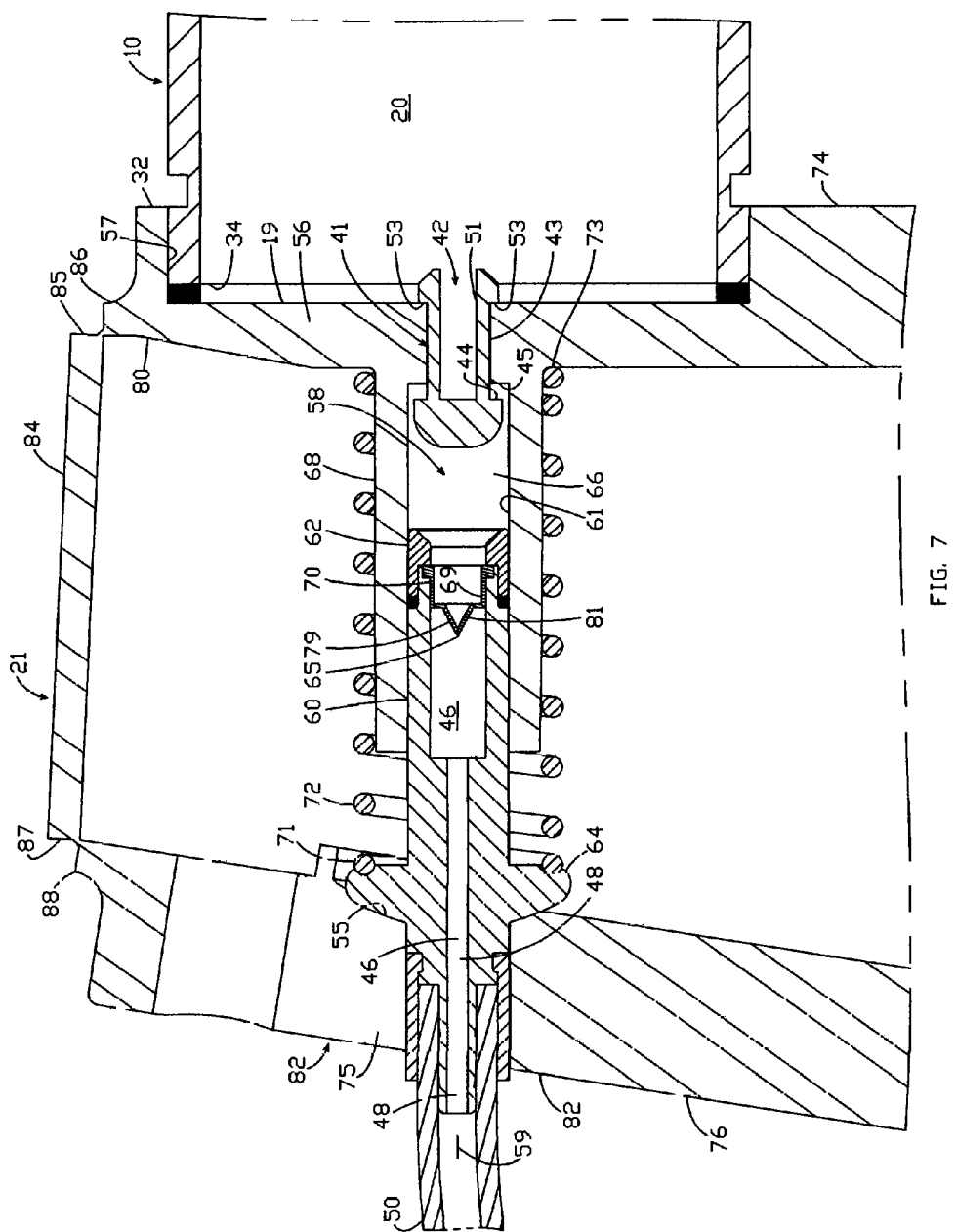
FIG. 7 is an enlarged view as in FIG. 6 showing the valving system in the approximate middle of its suction or loading mode.

FIGS. 6 and 7 show a preferred embodiment of the present gun structure wherein in FIG. 7 the pump valving of head 21 is shown in its suction or grease loading mode wherein grease is being pulled from the cartridge through an inlet port 42 into a load chamber 66 of grease passage 46, which passage extends from inlet port 42 to au outlet end 48 of said passage, which end 48 connects in keyhole portion 75 formed through handle 76 into hose 50 having a ZERK or other fitting component 52 on its ejection end 54 Head 21 in this preferred embodiment comprises a body wall 56 having said grease passage 46 formed therethrough, said passage having said outlet end 48 and a grease pressurizing cylinder portion 58 containing a piston 60 having a proximal head 62 end portion and a distal actuating end portion 64 which can slide arcuately against arcuate saddle surface 55 on distal handle means 76, and being slidable in said cylinder portion 58 on a longitudinal axis 59 of said passage 46. The grease inlet port 42 is formed through an annular cap portion 19 of body wall 56 and is in communication with a proximal end 66 of said passage 46 and with cartridge reservoir chamber 20 wherein proximal end 66 provides the grease loading chamber. A first one way inlet valve 41 is positioned in said inlet port 42 and is adapted to allow grease to flow through said port 42 on the suction stroke (FIG. 7) of piston 60 in cylinder bore 61 into chamber 66 wherein it is pressurized on the ejection stroke (FIG. 6) of said piston 60 which seals off said inlet port 42 and opens a second one way valve 70 positioned in fixed position on piston 60 adjacent proximal head end portion 62 of piston 60. It is particularly noted that valve 70 is positioned on the proximal end portion 62 of piston 60 such that the volume of air in load chamber 66 is reduced to a minimum on the initial ejection stroke of piston 60, whereby upon the initial suction stroke of 60 the pumping system does not have to work to expand the air in 66, i.e., which decrease its density, whereby the present pumping system becomes self-priming. A compression spring 72 is mounted around annular tubular projection 68 on body wall 56 and urges piston 60 in a suction stroke direction. Handle means 74 and 76 on said body are adapted to be squeezed together against the force of spring 72 to move piston 60 in cylinder portion 58 in a grease pressurizing (ejection) proximal direction.

In the above grease gun construction, head body 23 is formed into a single piece of molded plastic material and comprises the cap section 19 having body wall 56 formed on its proximal side with a cavity 57 adapted to receive and to be sealingly connected to top open end 34 of said grease cartridge 10. Wall 56 is formed on its distal side with the tubular projection 68 projecting axially outwardly from said distal side and providing said cylinder portion 58. The proximal handle means 74 is formed integrally with cap section 19. The distal handle means 76 has a lower hand grip end 78, an upper pivot end 80, and an intermediate portion 82 which engages actuating end portion 64 of said piston. The single piece head body molding further has a resilient hinge section 84 having a proximal end 85 integrally molded to a top portion 86 of said cap section 19 and having its distal end 87 integrally molded to a top portion 88 of said handle means 76 which allows the mid and lower portions of both said handle means to be moved together to force said piston 60 into a pressurizing (ejection) stroke and eject said grease through said second one way valve 70 and out of said outlet end 48 of said passage 46. The spring means 72 is a coiled compression spring which is close fitted around tubular projection 68, wherein a proximal end 73 of said spring bears against cap section 19 in a proximal direction, and wherein a distal end 71 of said spring bears against actuating end portion 64 of piston 60 in a distal direction.

Further in the above gun construction the second one-way valve 70 comprises a body 69 of flexible, resilient, elastomeric material through which an orifice 65 is formed, wherein the orifice is closed during the piston suction stroke, and is forced open by pressurized grease during the grease pressurizing (ejection) stroke.

In preferred embodiments, orifice 65 for both valve 70 and primer bulb valve 24 is provided through a tip 67 of a resilient, elastomeric cone shaped portion of valve 70, wherein said tip is facing distally in passage 46. Most preferably, orifice 65 is a slit provided by two elongated flaps 79, 81 of said valve body 69 wherein said flaps project distally from said body 69 and converge distally to form said slit which is normally tightly closed on said suction stroke of said piston. Alternatively, the port provided by the slit can be a very small aperture 89 (FIG. 13) which, under pressure against its proximal side will widen as in 89(*a*) and allow the flow of grease therethrough. In FIG. 8, the dotted line 83 shows the slit port in an open mode.

As shown in FIGS. 14-16, the first one way inlet valve 41 is formed with a shank section 43 which is slidably mounted through bearing 41(*a*) forming inlet port 42, and is further formed with an annular inlet port sealing surface 44 adapted to seal against a sealing surface 45 on cap section 19. As shown in FIGS. 14-16, shank section 43 is divided into two halves 47, 49 which provides gap 51 as seen in FIGS. 15, 16, which gap allows grease to flow into load chamber 66 on the suction stroke. Stop shoulders 53 prevent valve 41 from being sucked too far into load chamber 66.

The invention has been described in detail with particular reference to preferred embodiments thereof, but it will be understood that variations and modifications will be effected within the spirit and scope of the invention.

I claim:

1. A grease gun construction comprising a grease pumping head mounted on an open end of a grease cartridge having a grease containing reservoir wherein an air bleed aperture is formed through a wall portion of said cartridge at a location below a bottom end of grease within said reservoir, and wherein major portions of the cartridge wall are transparent, said head having a body formed with a cylinder portion having a bore extending through said body, a piston having a proximal head end portion and a distal actuating end portion and being slidable in said cylinder portion on a longitudinal axis of said cylinder portion, said piston having a grease passage extending therethrough, said passage having a distal outlet end and a proximal grease inlet end, a grease inlet port in said body communicating with a proximal end of said cylinder and with said reservoir, a first one way valve positioned in said inlet port and adapted to allow grease to flow through said port into a proximal end of said cylinder on a suction stroke of said piston, and to seal off said port on an ejection stroke of said piston, a second one way valve is positioned in fixed position in said head end portion of said piston and is adapted to seal off said passage on said suction stroke and to allow said grease to flow into said passage on said ejection stroke, spring means engaging said body and said piston and urging said piston in a suction stroke direction, and a piston of handle means on said body and engageable with said piston and a pair of handle means on said body and adapted to be squeezed together against a force of said spring to move said piston in said cylinder portion in a grease ejecting direction.

2. The grease gun construction of claim 1 wherein said body is formed into a single piece of molded plastic material and comprises a cap section having a body wall formed on a proximal portion of said body and having a proximally facing cavity adapted to receive and to be sealingly connected to said open end of said grease cartridge, said body wall being formed on a distal side of said body with a tubular portion projecting generally axially outwardly from said distal side and providing said cylinder portion, wherein a first handle means is formed integrally with said cap section, wherein a second handle means has a lower hand grip end, an upper pivot end, and an intermediate portion which engages said actuating end portion of said piston, and wherein said single piece molding further has a resilient hinge section having a proximal end integrally molded to a top portion of said cap section and having a distal end integrally molded to said upper pivot and of said second handle means, whereby said hinge section allows the mid and lower portions of both said handle means to be moved together to force said piston into an ejection stroke which ejects said grease through said second one way valve and out of said outlet end of said passage.

3. The grease gun construction of claim 2 wherein said spring means is a coiled compression spring which is close fitted around said tubular portion, wherein a proximal end of said spring bears against said cap section in a proximal direction, and wherein a distal end of said spring bears against said actuating end portion of piston in a distal direction.

4. The grease gun construction of claim 1 wherein said second one way valve comprises a body of flexible, resilient, elastomeric material through which a normally closed orifice is formed, wherein said orifice is normally closed during said suction stroke, and wherein said orifice is forced open by pressurized grease during said ejection stroke.

5. The grease gun construction of claim 4 wherein said orifice is provided through a tip of resilient, elastomeric material of a cone shaped portion of said second one way valve, wherein said tip is facing distally in said passage.

6. The grease gun construction of claim 4 wherein said orifice is a slit provided by two elongated flaps of said valve body wherein said flaps project distally from said body and converge distally to form said slit which is normally tightly closed on said suction stroke of said piston.

7. The grease gun construction of claim 6 wherein said first one way valve is formed with a shank section which is slidably mounted through said inlet port, and is further formed with an annular inlet port sealing surface adapted to seal against a sealing surface on said cap section.

8. A grease gun comprising a grease ejection head having a body containing a cylinder/piston grease pump combination structure having a longitudinal axis and a hand operated lever mechanism engaging said piston for reciprocating said piston along said axis within said cylinder, a valve structure in an inlet port of said cylinder for allowing grease to flow into said cylinder only on a suction stroke of said piston, a grease emitting port in said head communicating with an outlet port of said cylinder, said emitting port being connected into a grease inlet end of a grease transfer conduit having an outlet fitting on a grease outlet end of said conduit, an elongated, cylindrical, substantially transparent walled grease cartridge having an elongated grease containing cavity of uniform diameter and circumference and having a proximal end and a distal end, wherein said distal end of said cylinder is connected to said head and is in communication with said valve structure in said suction inlet port of said cylinder, wherein a wiper disc of substantially the same circumference as the inside surface of said cartridge wall is slidably mounted with close tolerance in said cavity below a bottom end of a grease column within said cavity to provide an air pressure chamber in said cartridge below said bottom end of said grease column, wherein said disc is free floating within said cylinder and which follows said bottom end of said grease column in a distal direction within said cavity through air pressure forces against a proximal side of said disc as said grease is being pumped from said cavity.

9. The grease gun of claim 8 wherein said lever mechanism comprises an elongated first handle means connected to said head and extending therefrom substantially at a right angle to said longitudinal axis, an elongated second handle means spaced longitudinally and distally from said first handle and oriented longitudinally substantially parallel to said first handle, each said handle means having an upper end portion extending above said cylinder/piston pump combination structure, an intermediate portion and a lower end portion providing a hand grip, wherein a hinge structure of resilient, flexible plastic material is connected to and between said upper end portions for allowing said lower portions of said handles to be forced toward each other and then to be retracted apart, wherein compression spring means is mounted on a distal portion of said head, wherein said distal portion comprises a tubular projection extending generally axially distally from said distal surface and is formed with said cylinder, wherein one end of said spring means bears against said distal surface of said head and wherein the other end of said spring means bears against a distal end of said piston, and wherein said distal end of said piston bears against said intermediate portion of said second handle means, wherein said intermediate portion lies substantially on said longitudinal axis.

10. The grease gun of claim 9 wherein said spring means is mounted around and is in contact with an outer distal surface of said tubular projection.

11. The grease gun of claim 9 wherein said ejection head, both of said handle means, and said hinge structure are integrally connected and are formed together in a plastic molding operation.

12. The grease gun of claim 8 wherein a cap structure on a proximal end portion of said cartridge is provided with a one-way ambient air check valve for allowing ambient air to pass into said pressure chamber during the suction stroke of said piston in order to maintain substantially ambient air pressure against the proximal side of said wiper disc and of said grease.

13. The grease gun of claim 12 wherein said ambient air check valve is provided with a hand operated elastomeric resilient air pressurizing bulb for increasing, if desired, the air pressure in said pressure chamber.

14. The grease gun of claim 12 wherein the proximal end of said cartridge is closed by said end cap and wherein an air vent is provided through a portion of said cartridge wall or end cap which lies proximal to the most proximal position of said wiper disc within said cavity.

\* \* \* \* \*